(12) United States Patent
Guerra

(10) Patent No.: US 7,637,790 B1
(45) Date of Patent: Dec. 29, 2009

(54) OUTBOARD PROPULSION SYSTEM FOR VESSELS

(76) Inventor: Orlando Guerra, P.O. Box 591128, Houston, TX (US) 77259

( * ) Notice: Subject to any disclaimer, the term of this patent is extended or adjusted under 35 U.S.C. 154(b) by 30 days.

(21) Appl. No.: 11/969,853

(22) Filed: Jan. 4, 2008

(51) Int. Cl.
*B60L 11/00* (2006.01)
*B63H 21/17* (2006.01)
*B63H 21/22* (2006.01)
*B63H 23/00* (2006.01)

(52) U.S. Cl. .............................................. 440/6; 440/1
(58) Field of Classification Search ...................... 440/1, 440/6
See application file for complete search history.

(56) References Cited

U.S. PATENT DOCUMENTS

| | | | |
|---|---|---|---|
| 6,668,954 B2 | 12/2003 | Field | |
| 6,855,016 B1 * | 2/2005 | Jansen | ............................ 440/6 |
| 7,207,852 B2 | 4/2007 | Myers | |
| 7,237,634 B2 | 7/2007 | Severinsky et al. | |
| 7,241,192 B2 | 7/2007 | Andersen et al. | |
| 7,381,107 B2 * | 6/2008 | Ishikawa et al. | ................ 440/6 |
| 7,473,149 B2 * | 1/2009 | Mizokawa | ..................... 440/6 |
| 2007/0068163 A1 | 3/2007 | Ishikawa et al. | |

* cited by examiner

*Primary Examiner*—Lars A Olson
*Assistant Examiner*—Daniel V Venne
(74) *Attorney, Agent, or Firm*—Conley Rose, P.C.

(57) ABSTRACT

An outboard propulsion system is disclosed. In some embodiments, the outboard propulsion system includes a generator operable to produce a first electrical signal, an engine electrically coupled to the generator, an inverter electrically coupled with the generator to receive the first electrical signal, wherein the inverter is adapted to transform the first electrical signal into a second electrical signal, all electric motor electrically coupled to the inverter to receive the second electric signal, a shaft mechanically coupled to the electric motor and rotatable by the electric motor when the electric motor receives the second signal, and a thrust generation device mechanically coupled to the shaft. The engine is configured to operate the generator. The thrust generation device is adapted to rotate when the shaft rotates.

10 Claims, 4 Drawing Sheets

OUTBOARD PROPULSION SYSTEM FOR VESSELS

BACKGROUND OF THE INVENTION

1. Field of the Invention

This disclosure relates generally to an outboard propulsion system for a vessel. More particularly, this disclosure relates to an outboard propulsion system wherein a mechanical connection between the engine and the propeller is not required and wherein the operation of each component of the system may be optimized.

2. Description of the Prior Art

The usage of hybrid propulsion systems has been growing in the last years as a consequence of fuel savings needs, among other reasons. This type of system brings great advantage for the marine industry. The pioneer versions of this type of system are emerging in the industry.

One of the main issues considered as an obstacle with regard to this type of system in the marine industry is precisely their installation, because it turns out to be a very expensive and time consuming task. Moreover, the installation is based on a high number of independent components or devices, which are installed in different locations, depending on the particular characteristics of the vessel or boat. This means that the installation process cannot be standardized for each boat; rather, it needs to be customized, making the installation and maintenance more complex and highly dependent on specialized professionals.

A conventional marine hybrid system typically includes one or more generator units coupled to one or more motor drives. The motor drive(s) changes the boat speed as well as controls the propulsion motor(s). A generator unit is formed by a gas or diesel engine mechanically linked to an AC or DC generator. Other types of generators that could be used, either individually or in combination with an AC or DC generator include: solar panels, batteries, fuel cells, or other electrical generation technologies. The generators can be cooled using water or air, and usually their work speed is fixed or controlled depending on the nominal frequency of the current which powers them.

The motor drive is used to change the speed or torque of the motor. The motor drive controls and monitors a set of parameters in the motor(s) and/or generator(s). The motor drive, or inverter, can be cooled by water or air. Water is typically used in the marine applications since water is available in large quantities.

The propulsion motors can be AC or DC. The main differences between AC and DC motors are their size and weight for a given power capability. AC motors weigh less and are smaller in size than DC motors; however, their electronic systems are more complex than that of DC motors.

The devices mentioned above, meaning the motor drive, propulsion motor, and generator units, typically have a protection panel as well as a general control device. This general control device monitors all of the parameters and variables of the complete system. It also contains the algorithms that make it possible to generate electricity within tie values and operation points that allow a higher efficiency of the engine. In other words, the general control device is in charge of optimizing the generation of electricity based on demand. This device also includes algorithms for fault detection, and can perform diagnostics if one or more of the devices fails or displays an inappropriate value.

Determining the position of the devices as well as installing them is a time intensive and costly process, which is not done properly, may result in a high number of system failures.

Moreover, if the devices are to be water-cooled, it is also necessary to position and install a cooling system with all of the devices involved.

Usually a marine propulsion system has a supervising device, or human machine interface, for the selection and configuration of the system controlled by the captain or person in charge of the boat. The captain can observe the parameters and configure the system according to the maneuver to be performed by the boat with this device.

In the outboard marine propulsion system industry, there are hybrid propulsion systems that have a mechanical connection between the engine and the propeller. These systems do not enable optimization of the operation of their subcomponents, or positioning and operation of their engine in a horizontal position. Furthermore, installation of these systems is costly and requires the skill of specialized technicians.

BRIEF SUMMARY OF THE INVENTION

An outboard propulsion system is disclosed. In some embodiments, the outboard propulsion system includes a generator operable to produce a first electrical signal, an engine electrically coupled to the generator, an inverter electrically coupled with the generator to receive the first electrical signal, wherein the inverter is adapted to transform the first electrical signal into a second electrical signal, an electric motor electrically coupled to the inverter to receive the second electric signal, a shaft mechanically coupled to the electric motor and rotatable by the electric motor when the electric motor receives the second signal, and a thrust generation device mechanically coupled to the shaft. The engine is configured to operate the generator. The thrust generation device is adapted to rotate when the shaft rotates.

BRIEF DESCRIPTION OF THE DRAWINGS

For a more detailed understanding of embodiments of the invention, reference is made to the accompanying Figures, wherein.

DESCRIPTION OF THE PREFERRED EMBODIMENTS

The invention is an outboard propulsion system which generates electricity using an engine-generator or alternator combination after a DC or direct current transformation, if needed. The electrical energy is supplied to an inverter, or motor drive. The inverter is electrically connected to an electric motor, which is, in turn, mechanically joined to the propeller. The outboard propulsion system also has a control section to monitor each component of the system, as well as change and control system parameters and configuration, including the engine speed and the on-off functionality of the engine, enabling the engine to be run at an optimized state.

Figure 1:
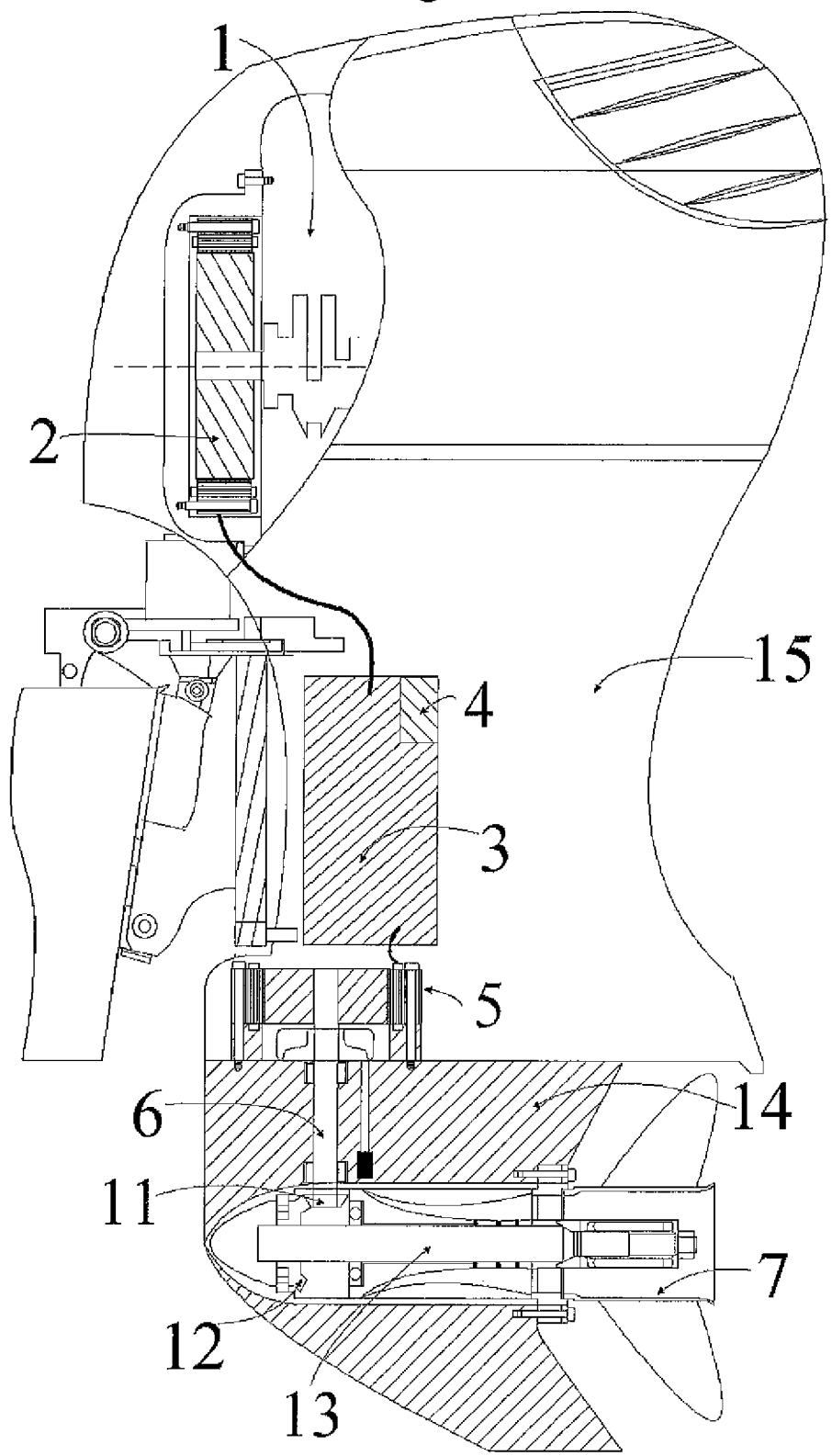
FIG. 1 is a schematic view of an outboard propulsion system in accordance with all embodiment of the invention.

Referring to FIG. 1, an outboard motor for a vessel or boat, denoted generally by the reference numeral (15), is shown with the major elements identified. The outboard motor (15) includes an internal combustion engine denoted generally by the reference numeral (1), which is mechanically joined to an electric generator denoted generally by the reference numeral (2) to provide the necessary electrical energy. An inverter denoted generally by the reference numeral (3) is electrically connected to, or fed by, the generator (2). The inverter rectifies or transforms the AC current from the generator (2) to a DC current to be transformed again to AC current in the inverter (3). This enables precise control of the electric motor (5) speed. The electric motor (5) is electrically coupled to the inverter (3). The inverter (3) changes the voltage and frequency of current provided by the generator (2) based on a selected algorithm within the inverter (3). The electric motor (5) is mechanically coupled to a lower unit shaft (6) that is joined to the propeller, or similar part that generates thrust. The control unit (4) has a data acquisition system that monitors the other components in the system, checking for accurate functioning of the components under established working parameters. Data acquired by control unit (4) together with a command or speed signal provided by a Captain or operator of the vessel is used by control unit (4) to generate different signals or commands, which are then delivered to the rest of the components in the system, causing each of the other components in the outboard motor (15) to operate at the most appropriate operational state.

Figure 2:
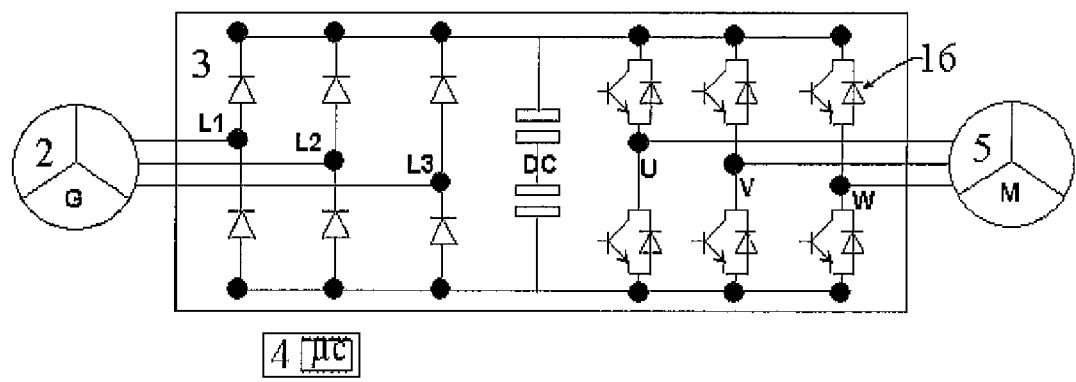
FIG. 2 is a schematic view of the electrical power connections.

FIG. 2 is a schematic view of the electrical power connection. The electric generator (2) is electrically connected to inverter (3) by three wires that are identified as L1, L2, and L3. Electric power from electric generator (2) flows through these wires L1, L2, L3 to a rectifying bridge that transforms the current from AC to DC. The rectifying bridge is joined to a set of capacitors forming a DC-Link. The DC-Link is the starting point for interconnection of other system devices. Inverter (3) includes a set of specially designed electronic components (16), which along with a pulse width modulator (PWM), transform the DC current to create an alternate signal that contains the appropriate levels of current for motor (5) speed variation, for example. Electronic components (16) are electrically coupled to the electric motor (5) using a set of wires. Typically, there are other signal groups to compliment the motor (5) speed control; such signals are not shown in this figure. Control algorithms are distributed between inverter (3) and the control unit (4), which could generally have hardware and software specifically design for such function.

Figure 3:
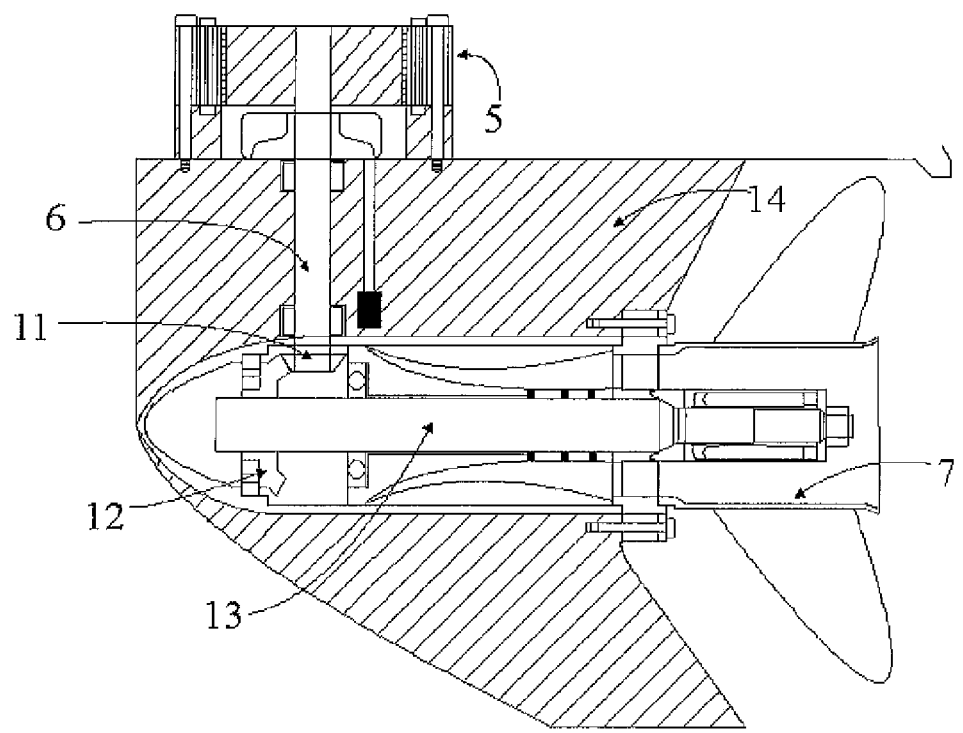
FIG. 3 is a partial sectional view of the outboard marine propulsion lower unit.

FIG. 3 is cross-sectional view of an outboard marine propulsion lower unit. The shaft (6) has been previously mechanically coupled to the propulsion electric motor (5) and to a bevel gear (11). A combination of bevel gears (11), (12) is used for the transmission of motion. In contrast to the conventional units, with this unit it is possible to eliminate the reduction, or use a ratio 1:1, because the combination rpm torque can be implemented with the propulsion electric motor (5). Also, the conventional shift mechanism or rotation direction change is eliminated since this functionality will be made by the propulsion electric motor (5) and the inverter, or motor drive, (3). Using a 1:1 reduction, it is possible to reduce the diameter of the bevel gears (11) and (12), so that the diameter for the gear case (14) will be smaller; therefore, offering less water resistance. The propeller shaft (13) is mechanically coupled between the propeller (7) and the bevel gear (12). The propeller shaft (13) is used to transmit torque between the bevel gear (12) and the propeller (7).

Figure 4:
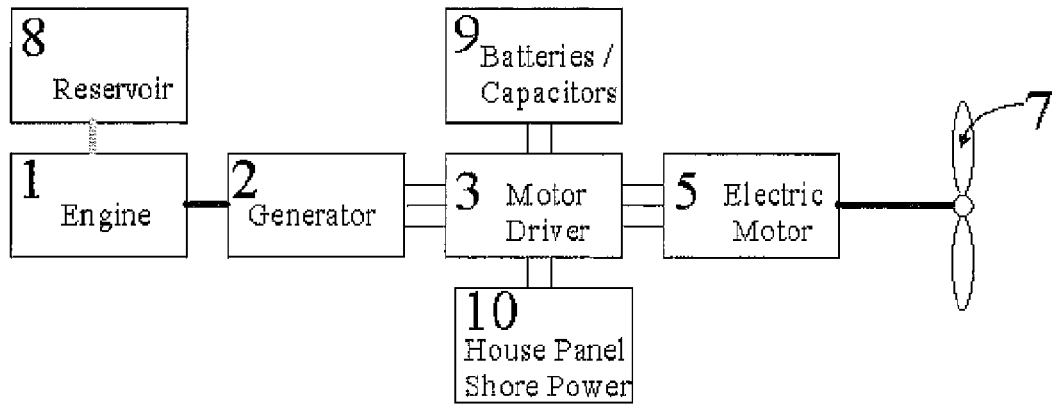
FIG. 4 is a block diagram of a marine propulsion system in accordance with the invention.

FIG. 4 is a block diagram of an outboard propulsion system in accordance with the invention. The system includes a reservoir 8 to store the fuel. The reservoir 8 is in fluid communication with an internal combustion engine (1). The engine (1) is mechanically coupled to an electric generator (2). Electric generator (2) typically has an output of 3 ph AC current. Electric generator (2) is also electrically coupled to an inverter, or motor drive, (3). The inverter (3) is electrically coupled to one or more energy storage devices (9), such as but not limited to batteries and/or capacitors, and to a distribution panel and/or short power (10). The distribution panel (10) is used to distribute electric power on board and/or electric energy input from the shore connection. The inverter (3) is also electrically coupled to the electric propulsion motor (5), which is, in turn, mechanically coupled to propeller (7).

Figure 5:
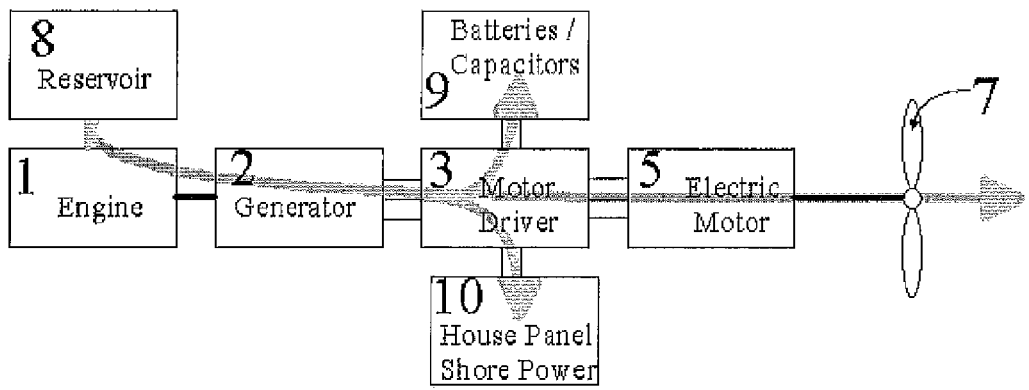
FIG. 5 is a block diagram of the energy flux during the standard mode of the system.

FIG. 5 is a block diagram of the energy flux during the standard mode of the system. It represents the energy flow in the system during standard operation mode, which begins with the feeding of fuel from reservoir (8) to the internal combustion engine (1). As the internal combustion engine (1) is mechanically coupled to generator (2), when combustion engine (1) turns its output shaft, the generator shaft also turns, producing a voltage at its terminals. Such voltage is proportional to the rotation speed. This electric power is transmitted to the motor drive or inverter (3), and, after being rectified, is available in the DC-Link for charging the batteries and/or capacitors (9) and distribution to the house panel (10). The energy in the DC-Link is transformed to AC to control the speed of the electric motor (5) to move propeller (7), or other device that by rotating generates thrust.

Figure 6:
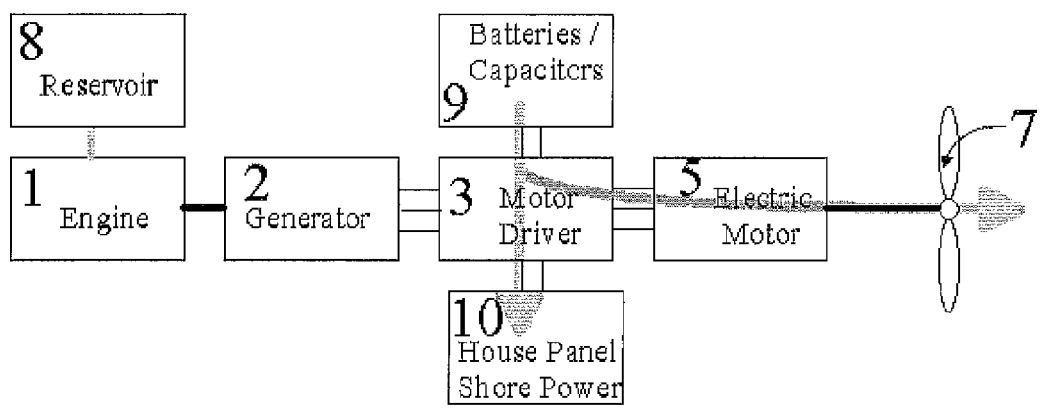
FIG. 6 is a block diagram of the energy flux during the electric-only mode of the system.

FIG. 6 is a block diagram of the energy flux during the electric-only mode of the system. It shows the energy flow from the storage devices, batteries and/or capacitors (9) transmitted to the DC-Link of motor drive or inverter (3). The electric motor (5) moves the propeller (7), or device that generates thrust, utilizing the energy transformed to AC in the inverter (3) from the DC-Link. The existing energy or energy stored in the batteries and/or capacitors is also used for the onboard distribution through the house panel (10) or hotel power.

Figure 7:
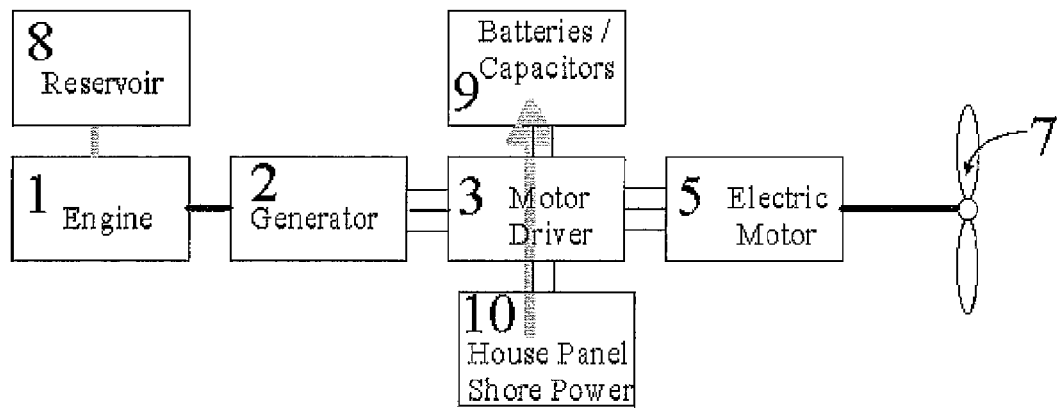
FIG. 7 is a block diagram of the energy flux during the charging mode of the system.

FIG. 7 is a block diagram of the energy flux during the charging mode of the system. Having the shore power (10) electrically connected to the motor drive or inverter (3) enables the transfer of electric power to the storage devices (9), such as the batteries and capacitors. The energy incorporated from the shore power can also be used for the onboard distribution or hotel power by the house panel (10).

Figure 8:
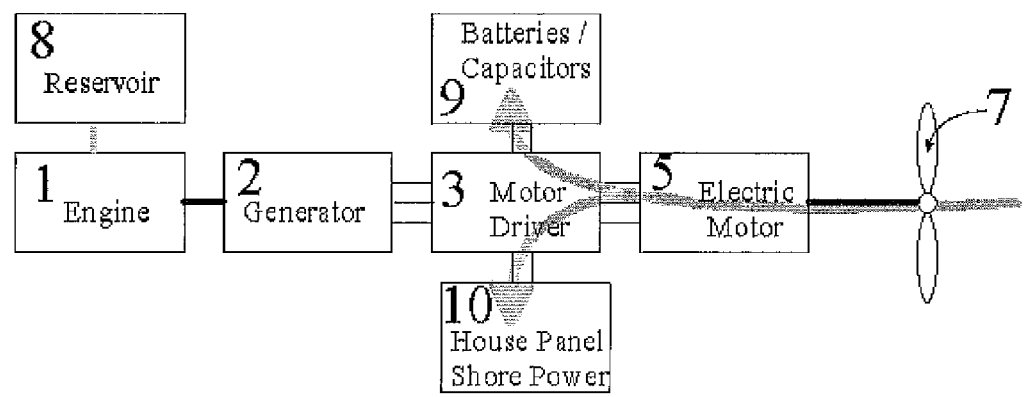
FIG. 8 is a block diagram of the energy flux during the electric-generation mode of the system.

FIG. 8 is a block diagram of the energy flux during the electric-generation of the system. The electric flow during the electric-generation mode is shown in this figure. The electric flow is based on the rotation of propeller (7), or device that by means of a flowing force rotates. The motor drive (3) receives electric power as a result of the mechanical motion produced in the electric motor (5) when the propeller (7) rotates. Consequently, the motor drive (3) provides electric energy to the storage device (9), such as batteries and capacitors, and to the house panel (10). It is also possible to provide energy to the distribution system by using the shore connection in the house panel (10).

I claim:
1. An outboard propulsion system for a boat comprising:
a generator operable to produce a first electrical signal;
an engine electrically coupled to the generator, the engine configured to operate the generator;

an inverter electrically coupled to the generator to receive the first electrical signal, the inverter adapted to transform the first electrical signal into a second electrical signal;

an electric motor electrically coupled to the inverter to receive the second electric signal;

a shaft mechanically coupled to the electric motor and rotatable by the electric motor when the electric motor receives the second signal; and a thrust generation device mechanically coupled to the shaft, the thrust generation device adapted to rotate when the shaft rotates.

2. The outboard propulsion system of claim 1, further comprising an electrical power source electrically coupled to the inverter and configured to produce the first electrical signal.

3. The outboard propulsion system of claim 2, wherein the electrical power source is at least one of a group consisting of a battery, a solar panel, and a fuel cell.

4. The outboard propulsion system of claim 3, wherein the thrust generation device is rotatable to rotate the shaft, whereby the electric motor delivers a third electric signal to the inverter, wherein the inverter is further configured to transform the third electric signal to a fourth electrical signal delivered to and stored by the electrical power source.

5. The outboard propulsion system of claim 1, wherein the first electrical signal is a first AC current and wherein the inverter is configured to transform the first AC current to a DC current and to transform the DC current to a second AC current.

6. The outboard propulsion system of claim 5, wherein the inverter comprises a rectifying bridge configured to convert AC current to DC current and a plurality of capacitors.

7. The outboard propulsion system of claim 1, wherein the thrust generation device is a propeller.

8. The outboard propulsion system of claim 1, further comprising a data acquisition system configured to monitor operating parameters of the electric motor and to receive input from an operator of the boat.

9. The outboard propulsion system of claim 8, further comprising a control unit configured to receive data from the data acquisition system and the input from the operator and to generate a command based on the data and the input that is delivered to the inverter to change the second electric signal.

10. The outboard propulsion system of claim 1, further comprising a first gear and a second gear each mechanically coupled between the shaft and the thrust generation device, wherein the first and second gears having a one-to-one gear reduction.

* * * * *